(12) United States Patent
Tian

(10) Patent No.: US 11,102,089 B2
(45) Date of Patent: Aug. 24, 2021

(54) METHOD AND SYSTEM FOR CONSTRUCTING CONTENT DELIVERY NETWORK PLATFORM ON HETEROGENEOUS RESOURCES

(71) Applicant: WANGSU SCIENCE & TECHNOLOGY CO., LTD., Shanghai (CN)

(72) Inventor: Lingxiang Tian, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 187 days.

(21) Appl. No.: 16/463,937

(22) PCT Filed: Jun. 1, 2017

(86) PCT No.: PCT/CN2017/086770
§ 371 (c)(1),
(2) Date: May 24, 2019

(87) PCT Pub. No.: WO2018/205325
PCT Pub. Date: Nov. 15, 2018

(65) Prior Publication Data
US 2020/0389372 A1    Dec. 10, 2020

(30) Foreign Application Priority Data
May 8, 2017  (CN) .......................... 201710316602.1

(51) Int. Cl.
*G06F 15/173* (2006.01)
*H04L 12/24* (2006.01)
*H04L 29/06* (2006.01)

(52) U.S. Cl.
CPC .......... *H04L 41/509* (2013.01); *H04L 41/044* (2013.01); *H04L 41/06* (2013.01);
(Continued)

(58) Field of Classification Search
CPC . H04L 41/509; H04L 41/044; H04L 41/5051; H04L 41/06; H04L 41/145; H04L 65/40
See application file for complete search history.

(56) References Cited

U.S. PATENT DOCUMENTS

| 2007/0233455 | A1  | 10/2007 | Zimmer et al. |
| 2014/0111698 | A1* | 4/2014  | Jain .......................... G06F 3/067 348/734 |

(Continued)

FOREIGN PATENT DOCUMENTS

| CN | 101340368 A | 1/2009 |
| CN | 101388785 A | 3/2009 |

(Continued)

OTHER PUBLICATIONS

The China National Intelleectual Property Administration (CNIPA) The China Search Report for 201710316602.1 dated Jun. 3, 2019 17 Pages.

(Continued)

*Primary Examiner* — Richard G Keehn

(57) ABSTRACT

A method and system for constructing a content delivery network platform on heterogeneous resources are provided. The content delivery network platform includes a logic application layer and a basic resource layer. The construction method includes the following steps. After receiving an application creation request, the logic application layer determines actual resource configuration requirement information and resource type information of the application based on the application creation request, and sends the actual resource configuration requirement information and the resource type information to the basic resource layer. The basic resource layer creates a basic resource environment for the application based on the received actual resource configuration requirement information and the resource type information. Based on the self-defined logic (Continued)

application model, the present disclosure uses the ability modeling method to achieve the unified management of services constructed by a plurality of heterogeneous technical solutions such as physical machines, virtual machines, and containers.

17 Claims, 6 Drawing Sheets

(52) U.S. Cl.
CPC ........ *H04L 41/145* (2013.01); *H04L 41/5051* (2013.01); *H04L 65/40* (2013.01)

(56) References Cited

U.S. PATENT DOCUMENTS

| | | | | |
|---|---|---|---|---|
| 2016/0224461 A1* | 8/2016 | Araya | ................. | G06F 11/3644 |
| 2017/0237686 A1* | 8/2017 | Wang | ................... | H04L 47/803 |
| | | | | 709/219 |

FOREIGN PATENT DOCUMENTS

| | | | | |
|---|---|---|---|---|
| CN | 101764810 | A | | 6/2010 |
| CN | 102427473 | A | | 4/2012 |
| CN | 101388785 | B | * | 5/2012 |
| CN | 102624684 | A | | 8/2012 |
| CN | 102655532 | A | | 9/2012 |
| CN | 103885833 | A | * | 6/2014 |
| CN | 103885833 | A | | 6/2014 |
| CN | 104657918 | A | | 5/2015 |
| WO | 2012034397 | A1 | | 3/2012 |
| WO | 2013101217 | A1 | | 7/2013 |

OTHER PUBLICATIONS

The European Patent Office (EPO) The Extended European Search Report for 17909038.6 dated Oct. 7, 2019 11 Pages.
Chuanyang Miao, H.Vadn.1-NV Virtual Content Delivery Network—Network Virtualization, ITU-T Draft, Study Period 2017-2020, Study Group 16, Series TD60(WP 1/16), International Telecommunication Union, Jan. 2017, pp. 1-17, vol. 21/16, Geneva.
Costa-Perez Xavier et al., 5G-Crosshaul:An SDN/NFV Integrated Fronthaul/Backhaul Transport Network Architecture, IEEE Wireless Communications, Feb. 2017, pp. 38-45.
The World Intellectual Property Organization (WIPO) International Search Report and Written Opinion for PCT/CN2017/086770 dated Jan. 29, 2018 13 Pages.

* cited by examiner

METHOD AND SYSTEM FOR CONSTRUCTING CONTENT DELIVERY NETWORK PLATFORM ON HETEROGENEOUS RESOURCES

CROSS-REFERENCE TO RELATED APPLICATIONS

This application is a national phase entry under 35 U.S.C § 371 of International Application No. PCT/CN2017/086770 filed on Jun. 1, 2017, which claims priority of Chinese Patent Application No. 201710316602.1, filed with the State Intellectual Property Office of P. R. China on May 8, 2017, the entire contents of all of which are incorporated herein by reference.

FIELD OF THE DISCLOSURE

The present disclosure generally relates to the technical field of content delivery network and, more particularly, relates to a method and system for constructing a content delivery network platform on heterogeneous resources.

BACKGROUND

Constructed over the network, the content delivery network (CDN) often relies on a plurality of edge servers deployed in multiple locations. Through function modules of the central platform, such as the load balancing module, the content distributing module, and the scheduling module, etc., the CDN allows the user to access the content that is needed as close as possible, reduce network congestion, and improve the user access response speed and hit rate.

As the network develops, the conventional Hyper Text Transfer Protocol (HTTP) and downloading makes the amount of network data to increase rapidly, and the online gaming industry gradually becomes mature. In particular, the content that requires high bandwidth, such as network videos, put greater stress on the servers and the network bandwidth and has an urgent need for the content delivery network service. The content types of the websites are increased and enriched continuously, and under new demands, the website content and services such as streaming media, Flash, video, and downloading have become new major application objects. To accelerate various kinds of services such as software downloading, video streaming media, enterprise web application, business-to-business (B2B) transactions, and Web 2.0 interactions, the conventional content delivery network technology often incorporates technologies such as compression, traffic shaping, intelligent routing and network optimization. As the content types that can be accelerated by the content delivery network are enriched continuously, the services provided by the content delivery network has expanded from pure content acceleration to acceleration of applications and services. Take further consideration the popularity of live streaming, the content delivery network experiences new explosive growth. The conventional server mode has failed to well support the ever-growing content delivery network business.

The trend of cloud computing started since 2010 and the new virtualization technologies such as Docker that have emerged since 2013 bring new technical trends to the content delivery network. Such new technologies have their own advantages, and may partially overcome the disadvantages of the conventional physical server mode, thereby bringing higher flexibility and resource utilization rate, high availability in case of hardware failures, and higher operational efficiency, etc.

However, interfaces in new technologies are different from each other and are not compatible, thus resulting in a huge challenge for management. The existing technical solutions are mainly about integration of different systems, such as the management integration of the private cloud and the public could. However, a unified management system covering physical servers, virtual servers, virtual machines, and containers does not exist. OpenStack has realized a solution that integrates Docker. However, such solution is integration of performing Platform as a Service (PaaS) based on OpenStack, and the actual effect is not good. The solution does not support certain advanced features of Docker because Nova API is abstraction of machines whereas Docker API includes the abstraction of process/applications.

How to rapidly integrate the new technologies into the content delivery network system is a technical issue that needs to be solved immediately. The issues in existing technologies may include: (1) because management in individual systems have great difference, when a new subsystem is introduced to the content delivery network system, significant amount of manpower and resources is needed to integrate the new subsystem into the content delivery network system; (2) because compatibility between different subsystems is not high, a huge management challenge is generated for vertical management.

BRIEF SUMMARY OF THE DISCLOSURE

To solve issues in the existing technologies, embodiments of the present disclosure provide a method and system for constructing a content delivery network platform on heterogeneous resources. The technical solutions are as follows.

In one aspect, a method for constructing a content delivery network platform on heterogeneous resources is provided, the content delivery network platform may include a logic application layer and a basic resource layer, and the construction method may include the following steps:

after receiving an application creation request, determining, by the logic application layer, actual resource configuration requirement information and resource type information of an application based on the creation request, and sending, by the logic application layer, the actual resource configuration requirement information and the resource type information to the basic resource layer; and receiving, by the basic resource layer, the actual resource configuration requirement information and the resource type information, and creating, by the basic resource layer, a basic resource environment of the application based on the actual resource configuration requirement information and the resource type information.

Further, steps of after receiving an application creation request, determining, by the logic application layer, actual resource configuration requirement information and resource type information of an application based on the creation request, and sending, by the logic application layer, the actual resource configuration requirement information and the resource type information to a basic resource layer may specifically include:

registering application information in the logic application layer, verifying application basic information in the creation request, determining the actual resource configuration requirement information of the application based on application ability requirement information in the creation request after verification is passed, and sending the actual resource configuration requirement information and the resource type information to the basic resource layer.

Further, the application creation request includes at least the application basic information, the application ability requirement information, and the resource type information;

the application basic information includes: one or more of an application name, an IP address, and a deployment region;

the application ability requirement information includes: one or more of an API (Application Programming Interface) response ability, a bandwidth ability, a high availability ability, and an IO (Input/Output) ability; and the resource type information includes: one or more of a physical machine, a virtual machine, and a container.

Further, specific steps of after receiving an application creation request, determining, by the logic application layer, actual resource configuration requirement information and resource type information of an application based on the creation request, and sending, by the logic application layer, the actual resource configuration information and the resource type information to the basic resource layer may include:

registering the application basic information, the application ability information, and the application resource type information in the logic application layer;

after receiving the application creation request, querying, by the logic application layer, the registration information of the application, and comparing, by the logic application layer, the registration information of the application with information in the application creation request, thereby performing verification;

after verification is passed, querying, by the logic application layer, the utilization condition and the remaining condition of the application ability, and converting, by the logic application layer, the application ability requirement information into the actual resource configuration requirement information based on a query result;

when the application creation request includes the resource type information, sending, by the logic application layer, the resource type information in the application creation request and the actual resource configuration requirement information to the basic resource layer; and when the application creation request does not include the resource type information, querying, by the logic application layer, a pre-configured automatic creation strategy, determining, by the logic application layer, the resource type information of the deployed application based on the actual resource configuration requirement and the automatic creation strategy, and then sending the resource type information and actual resource configuration requirement information to the basic resource layer.

Further, the automatic creation strategy may include a current resource redundant condition, an existing resource allocation condition, and a desired resource type of the application itself.

Further, specific steps of creating, by the basic resource layer, a basic resource environment of the application based on the actual resource configuration requirement information and the resource type information may include:

abstracting, by the basic resource layer, the same type of technologies into a single resource type, finding a corresponding resource type based on the resource type information, finding a corresponding driver program based on the resource type and the actual resource configuration requirement information, and creating the basic resource environment of the application through the driver program in conjunction with the actual resource configuration requirement information.

Another aspect of the present disclosure provides a system for constructing a content delivery network platform on heterogeneous resources, comprising:

a logic application layer configured to, after receiving an application creation request, determine actual resource configuration requirement information and resource type information of an application based on the creation request, and send the actual resource configuration requirement information and the resource type information to a basic resource layer; and the basic resource layer, configured to create a basic resource environment of the application based on the actual resource configuration requirement information and the resource type information.

Further, the logic application layer includes:

a logic application management API module, configured to manage a service function module; and the service function module, configured to register the application information, verify the application basic information in the creation request through the logic application management API module, and upon successful verification, determine the actual resource configuration requirement information of the application based on the application ability requirement information in the creation request.

Further, the logic application management API includes:

an application lifecycle management API, configured to provide the application creation request that specifically includes looking up, deleting, adding, modifying, transferring and recovering of the application;

an application ability management API, configured to query and count utilization condition and remaining condition of the application ability;

an application information management API, configured to query the application basic information; and an application strategy management API, configured to configure and query the automatic creation strategy.

Further, the service function module includes:

an application information management sub-module, configured to register the application basic information, the application ability information, and the application resource type information, receive the application creation request sent by the application lifecycle management API, query the registration information of the application through the application information management API, and perform verification by comparison with the information in the application creation request;

an application ability management sub-module configured to, after verification is passed, query the utilization condition and remaining condition of the application ability counted by the application ability management API through the application ability management API, and then convert the application ability requirement information into the actual resource configuration requirement information based on a query result; and an application creation strategy management sub-module, configured to query the pre-configured automatic creation strategy through the application strategy management API when the application creation request does not include the resource type information, and determine the resource type information of the deployed application based on the automatic creation strategy and the actual resource configuration requirement.

Further, the basic resource layer includes:

a unified resource management API module, configured to manage a technology abstraction layer and a technology driver layer.

The technology abstraction layer is configured to abstract the same type of technologies into a resource type, and find a corresponding resource type through the unified resource management API module based on the resource type information.

The technology driver layer is configured to find a corresponding driver program based on the resource type of the technology abstraction layer and the actual resource configuration requirement information. Then, the driver program integrates the actual resource configuration requirement information to create the basic resource environment of the application through the unified resource management API module.

Further, the unified resource management API module includes:

a resource lifecycle management API, configured to manage the lifecycle of the basic resource, including querying, deleting, adding, and modifying the lifecycle of the basic resource, where the driver program integrates the actual resource configuration requirement information to create the basic resource environment of the application; and a resource inventory management API, configured to query and count utilization condition and remaining condition of different types of resources, and find a corresponding resource type in the technology abstraction layer based on the query result and the resource type information.

Further, resource types of the technology abstraction layer include: a physical machine, a virtual machine, and a container.

Further, the technology driver layer specifically includes: one or more of a physical machine management system driver, a private cloud management system driver, a cloud host management system driver, and a Kubernetes management system driver.

The beneficial effects brought by the technical solutions according to the present disclosure are as follows. The present disclosure provides a method and system for constructing a content delivery network platform on heterogeneous resources. Based on the self-defined logic application model, the present disclosure uses the ability modeling method to achieve the unified management of services constructed by a plurality of heterogeneous technical solutions such as physical machines, virtual machines, and containers, etc. By using heterogeneous technical solutions such as physical servers, virtual machines, public cloud hosts, and containers to construct the content delivery network, an application management service (service plane) may be separated from a resource architecture (technical plane). However, the unique values, features and intelligence of various resource technologies may remain. The basic resource layer uses a mode of two-layered abstraction driver to perform unified management on the resources, thereby rapidly adopting new technical solutions without changing the original structure. By using layered management, the operation and maintenance may be simplified. The upper layer service may self-define the service ability model and the creation strategy to achieve automatic deployment under a plurality of technical platforms, and different applications may share or individually own configurations, thus allowing the configuration to be flexible.

BRIEF DESCRIPTION OF THE DRAWINGS

To more clearly illustrate the technical solution in embodiments of the present disclosure, the accompanying drawings needed in the description of the disclosed embodiments are briefly described hereinafter. Obviously, the drawings described below are merely some embodiments of the present disclosure. For those ordinarily skilled in the relevant art, other drawings may be obtained based on such accompanying drawings without creative effort.

DETAILED DESCRIPTION

To make the objectives, technical solutions and advantages of the present disclosure clearer, embodiments of the present disclosure will be described more fully hereinafter with reference to the accompanying drawings.

Figure 1:
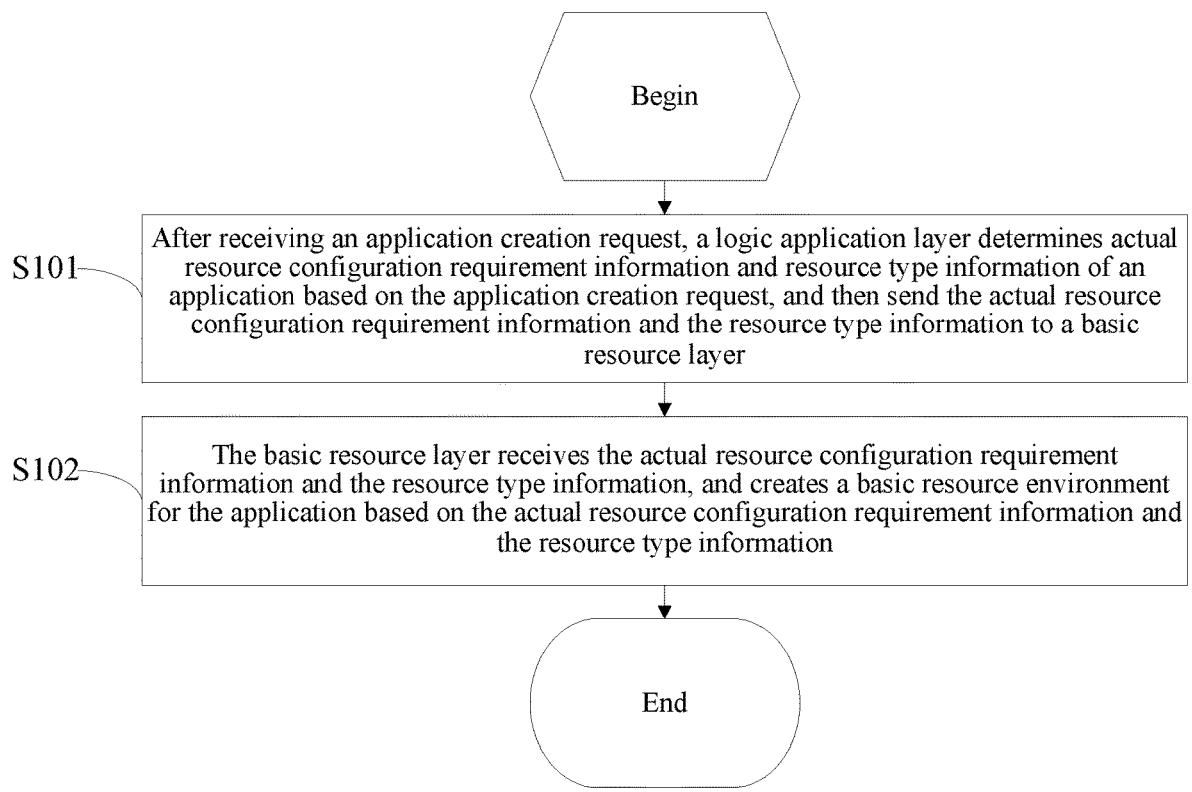
FIG. 1 is a flow chart of an exemplary method for constructing a content delivery network platform on heterogeneous resources according to the disclosed embodiments.

The present disclosure provides a method for constructing a content delivery network platform on heterogeneous resources. The content delivery network platform may include a logic application layer and a basic resource layer. As shown in FIG. 1, the construction method may include the following steps.

Step S101: after receiving an application creation request, the logic application layer determines actual resource configuration requirement information and resource type information of an application based on the application creation request, and then sends the actual resource configuration requirement information and the resource type information to a basic resource layer.

Because management in different technical solutions may have a relatively large difference, significant amount of manpower and resources is needed to integrate a new system of different technical solutions into the existing content delivery network system. At the same time, because compatibility between different technical solutions is relatively low, a huge management challenge is generated for vertical management. Directed towards the aforementioned issues, the present disclosure provides a unified abstract management method based on a logic application model, and by performing unified modeling on applications that are constructed on different technical solutions using the method of application ability, unified management of the applications may be realized in upper management.

The logic application model may be an application management basic unit that is abstracted by the present disclosure. Each logic application entity may include a service function program and a resource environment program. For example, when application A is deployed on a physical machine, the entity of the application A may include a function program of the application A itself, and a physical machine entity, system, and software environment that carry the operation of the function program.

Through the aforementioned method, the present disclosure may divide the content delivery network platform into the logic application layer and the basic resource layer. After receiving the application creation request, the logic application layer may determine the actual resource configuration requirement information and the resource type information of the application based on the creation request, and may send the actual resource configuration requirement information and the resource type information to the basic resource layer.

The application creation request may at least include application basic information and application ability requirement information. The application creation request may further include resource type information. The resource type information may be optional information, and the creation request may include no such information. When the resource type information is not included in the creation request, the logic application layer may perform determination and selection itself based needs in the creation process.

The application basic information may include: an application name, an IP (Internet Protocol) address, and a deployment region, etc. The application basic information may be mainly used to describe the basic information of the application, and may arbitrarily define required information based on the need. The foregoing descriptions only provide certain types of application basic information for illustrative purposes, and the basic application information may further include other information such as an application identity (ID). The present disclosure is not limited thereto.

The application ability requirement information may include: an application programming interface (API) response ability, a bandwidth ability, a high availability ability, and an output/input (IO) ability, etc. The application ability requirement information may be arbitrarily defined based on the need, and the aforementioned descriptions only provide certain exemplary types of application ability requirement information. For different application, other application ability information may exist, and the present disclosure is not limited thereto.

The resource type information may include: a physical machine, a virtual machine (also named as 'instance'), and container (also named as 'Docker').

Step S102: the basic resource layer receives the actual resource configuration requirement information and the resource type information, and creates a basic resource environment of the application based on the actual resource configuration requirement information and the resource type information.

Based on the self-defined logic application model, the present disclosure uses the ability modeling method to achieve the unified management of services constructed by a plurality of heterogeneous technical solutions such as physical machines, virtual machines, and containers, etc. By using heterogeneous technical solutions such as physical servers, virtual machines, public cloud hosts, and containers to construct the content delivery network, the application management service (service plane) may be separated from the resource architecture (technical plane), while the unique values, features and intelligence of various resource technologies still remain.

Figure 2:
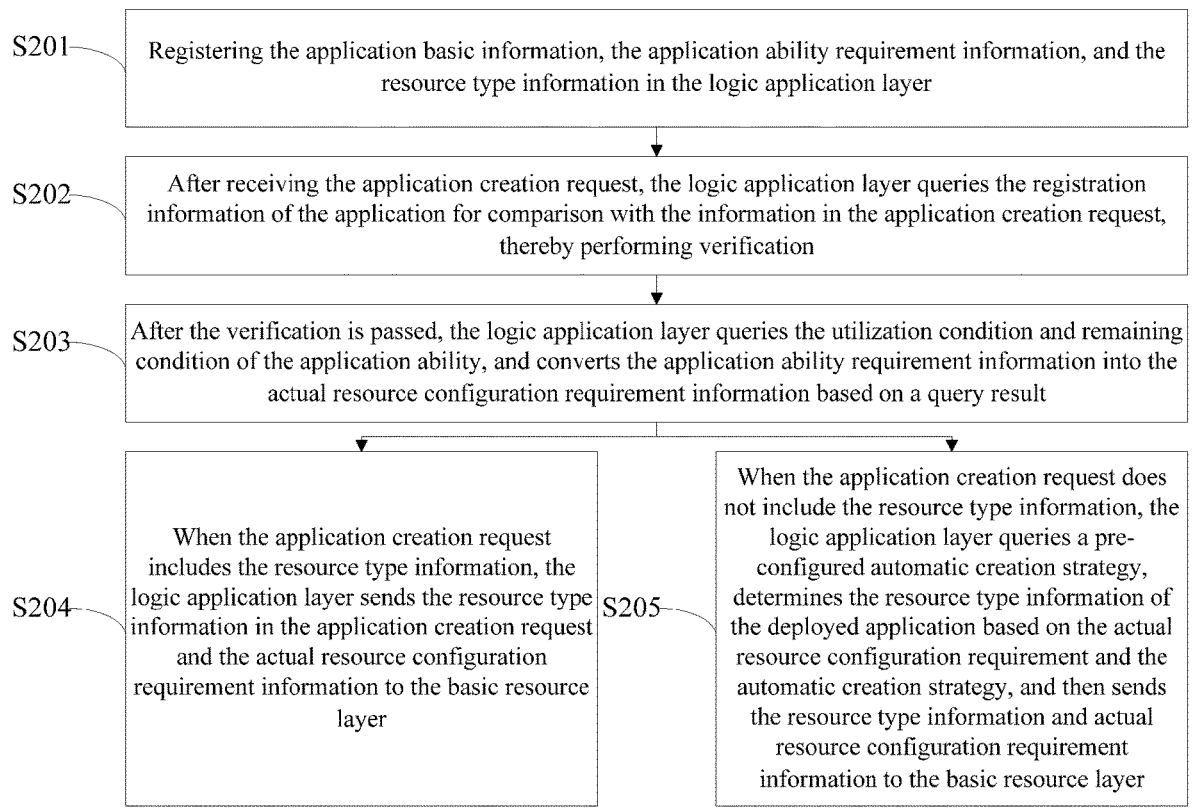
FIG. 2 is a detailed flow chart of step S101 in FIG. 1.

Specifically, as shown in FIG. 2, the step S101 in FIG. 1 may include the following specific steps:

Step S201, registering the application basic information, the application ability requirement information, and the resource type information at the logic application layer.

Before an application is created, various applications may need to be registered in advance in the logic application layer of the CDN system. The registration content may include the application basic information, the application ability requirement information, and the resource type information, etc. For example, for an application virtual machine A, content registered in the logic application layer may include: an application name of virtual machine A; an IP address of 192.168.1.10; a subnet mask of 255.255.0.0; a deployment region of Shandong Telecom; an application account of admin001; a virtual network card connection mode of bridging; a processing capability of 8-core processor; a memory capacity of 16 GB; a storage capacity of 480 GB; and a resource type information of virtual machine, etc.

Different applications may have different registration information in the logic application layer. The registration information may be compared with the application information in the creation request during the process of creating the application, thereby verifying the creation request and determining whether or not to create the application in the system.

Step S202: after receiving the application creation request, the logic application layer queries the registration information of the application for comparison with the information in the application creation request, thereby performing verification.

After receiving the request to create the application, the logic application layer may query the registration information that the to-be-created application have registered in advance in the logic application layer, such as the previously registered application account, application name, IP address, and deployment region, etc. Further, the registration information may be compared with the information in the creation request. If the information is consistent, the verification is successful, and the application may be continued to be created in the system. If the information is inconsistent, the verification fails, and the application creation process is terminated.

Step S203: after the verification is passed, the logic application layer queries the utilization condition and remaining condition of the application ability, and converts the application ability requirement information into the actual resource configuration requirement information based on a query result.

After verification is passed, the logic application layer may query the application ability utilization condition and the remaining application ability of the existing application in the current system. Based on the query result, the available application ability in the current system may be found, and with reference to the application ability requirement information in the creation request, the application ability requirement information, such as virtual network card connection mode of bridging, processing capability of 8-core processor, memory of 16 GB, and storage capacity of 480 GB, etc., may be converted into the actual resource configuration requirement information. Thus, the situation where the system encounters an error in the creation process due to insufficient application ability caused by application ability required by the application in the creation request exceeding the remaining application ability in the system may be avoided.

Step S204: when the application creation request includes the resource type information, the logic application layer sends the resource type information in the application creation request and the actual resource configuration requirement information to the basic resource layer.

When the application specifies the required resource type, i.e., the creation request includes the resource type information, the logic application layer may send the actual resource configuration requirement obtained in step S203 and the resource type information in the creation request directly to the basic resource layer. The basic resource layer may complete the subsequent resource configuration process.

Step S205: when the application creation request does not include the resource type information, the logic application layer may query a pre-configured automatic creation strategy, determine the resource type information of the deployed application based on the actual resource configuration requirement and the automatic creation strategy, and then send the resource type information and actual resource configuration requirement information to the basic resource layer.

The logic application layer may be configured with an automatic creation strategy in advance. The automatic creation strategy may determine the resource type information of the deployed application based on the conditions such as the current resource redundant condition, the existing resource allocation condition, and the desired resource type of the application itself with combination of the actual resource configuration requirement information. When the creation request includes the application basic information and the application ability requirement information but includes no resource type information, the logic application layer may query the pre-configured automatic creation strategy, and determine the resource type information of the deployed application by integrating the actual resource configuration requirement. Further, the logic application layer may send the actual resource configuration requirement and the resource type information to the basic resource layer. The basic resource layer may complete the subsequent resource configuration process.

The disclosed logic application layer may self-define the business ability model and the creation strategy, and complete the automatic deployment under various technical platforms. Different applications may share configurations or maintain individual configurations, and the configuration method may be flexible.

Figure 3:
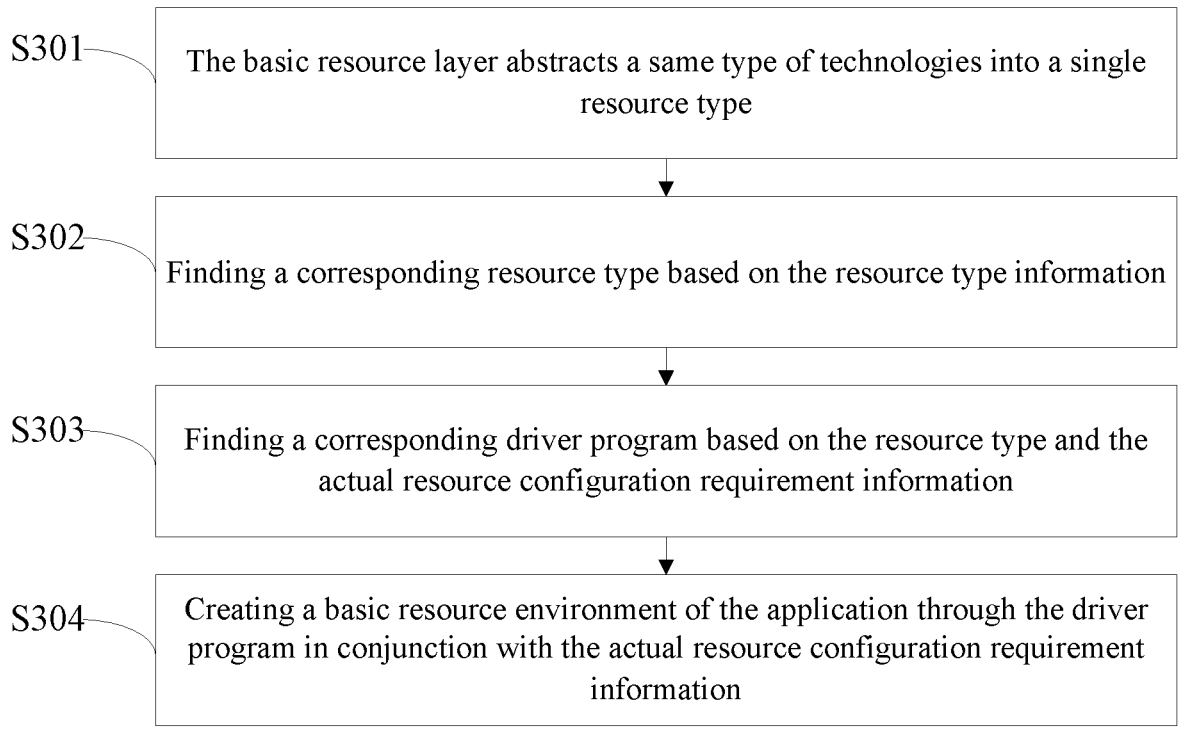
FIG. 3 is a detailed flow chart of step S102 in FIG. 1.

Specifically, as shown in FIG. 3, the step S102 in FIG. 1 may include the following specific steps.

Step S301: the basic resource layer may abstract a same type of technologies into a single resource type, such as physical machine, virtual machine ('Instance'), or container ('Docker'), etc. Each resource type may specifically include different driver programs, such as physical machine management system driver (Real Server Manager), private cloud management system driver (Private Cloud), cloud host management system driver (EC2), and Kubernetes management system driver, etc., which are not specifically listed by the present disclosure.

Step S302: finding a corresponding resource type based on the resource type information.

After receiving the actual resource configuration requirement information and the resource type information, the basic resource layer may find the corresponding resource type in the basic resource layer based on the resource type information.

Step S303: finding a corresponding driver program based on the resource type and the actual resource configuration requirement information.

After finding the corresponding resource type, the basic resource layer may select a suitable driver program corresponding to the resource type based on the actual resource configuration requirement.

Step S304: creating a basic resource environment of the application through the driver program in conjunction with the actual resource configuration requirement information.

The present disclosure adopts a layered management approach to simplify the operation and maintenance. The disclosed method only needs to properly maintain the resource condition of the internal service and ensure the proper operation and redundant condition of the resources, without paying excessive attention to the specific application content and application functions under operation.

Figure 4:
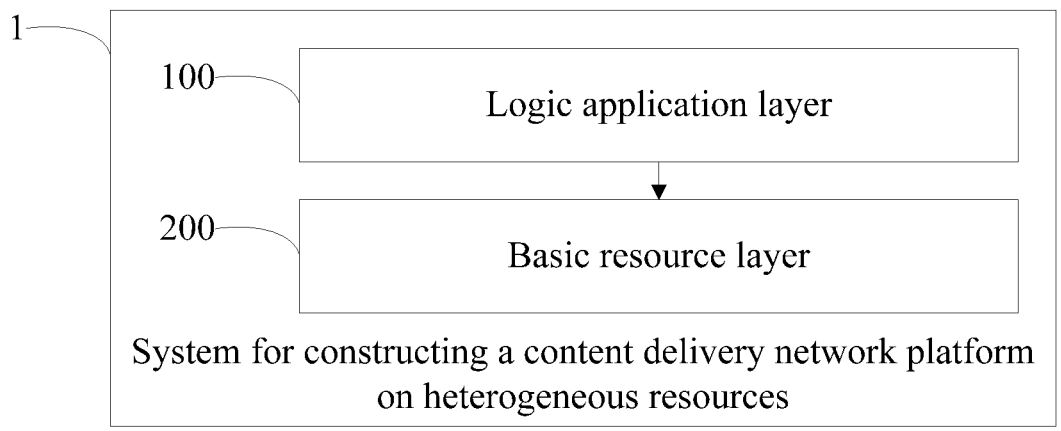
FIG. 4 is a block diagram of an exemplary system 1 for constructing a content delivery network platform on heterogeneous resources according to the disclosed embodiments.

The present disclosure further provides an exemplary system 1 for constructing the content delivery network platform on heterogeneous resources. As shown in FIG. 4, the system 1 may include a logic application layer 100 and a basic resource layer 200.

The logic application layer 100 may be configured to, after receiving an application creation request, determine actual resource configuration requirement information and resource type information of the application based on the creation request, and send the actual resource configuration requirement information and the resource type information to the basic resource layer 200.

The basic resource layer 200 may be configured to create a basic resource environment of the application based on the actual resource configuration requirement information and the resource type information.

Before the application is created, various applications need to be registered in advance in the logic application layer 100. The registration content may include application basic information, application ability information, and application resource type information, etc. The application creation request received by the logic application layer 100 may include at least the application basic information and the application ability requirement information. The application creation request may further include the resource type information. The application basic information may include one or more of an application name, an IP address, and a deployment region. The application ability requirement information may include one or more of an API response ability, a bandwidth ability, a high availability ability, and an input/output ability. The resource type information may include one or more of a physical machine, a virtual machine, and a container. After receiving the application creation request, the logic application layer 100 may verify the application basic information in the creation request. After verification is passed, the logic application layer 100 may convert the application ability information in the creation request into actual resource configuration requirement information. Then, the logic application layer 100 may send the actual resource configuration requirement information and the resource type information to the basic resource layer 200. The basic resource layer 200 may abstract a same type of technologies into a single resource type. Each resource type may specifically include different driver programs. The basic resource layer 200 may find a corresponding resource type based on the received resource type information, and then determine a suitable driver program corresponding to the resource type based on the actual resource configuration requirement. Finally, through the driver program, the basic resource layer 200 may create a basic resource environment of the application based on the actual resource configuration requirement information, and complete the deployment and configuration of the application based on the application requirement.

Figure 5:
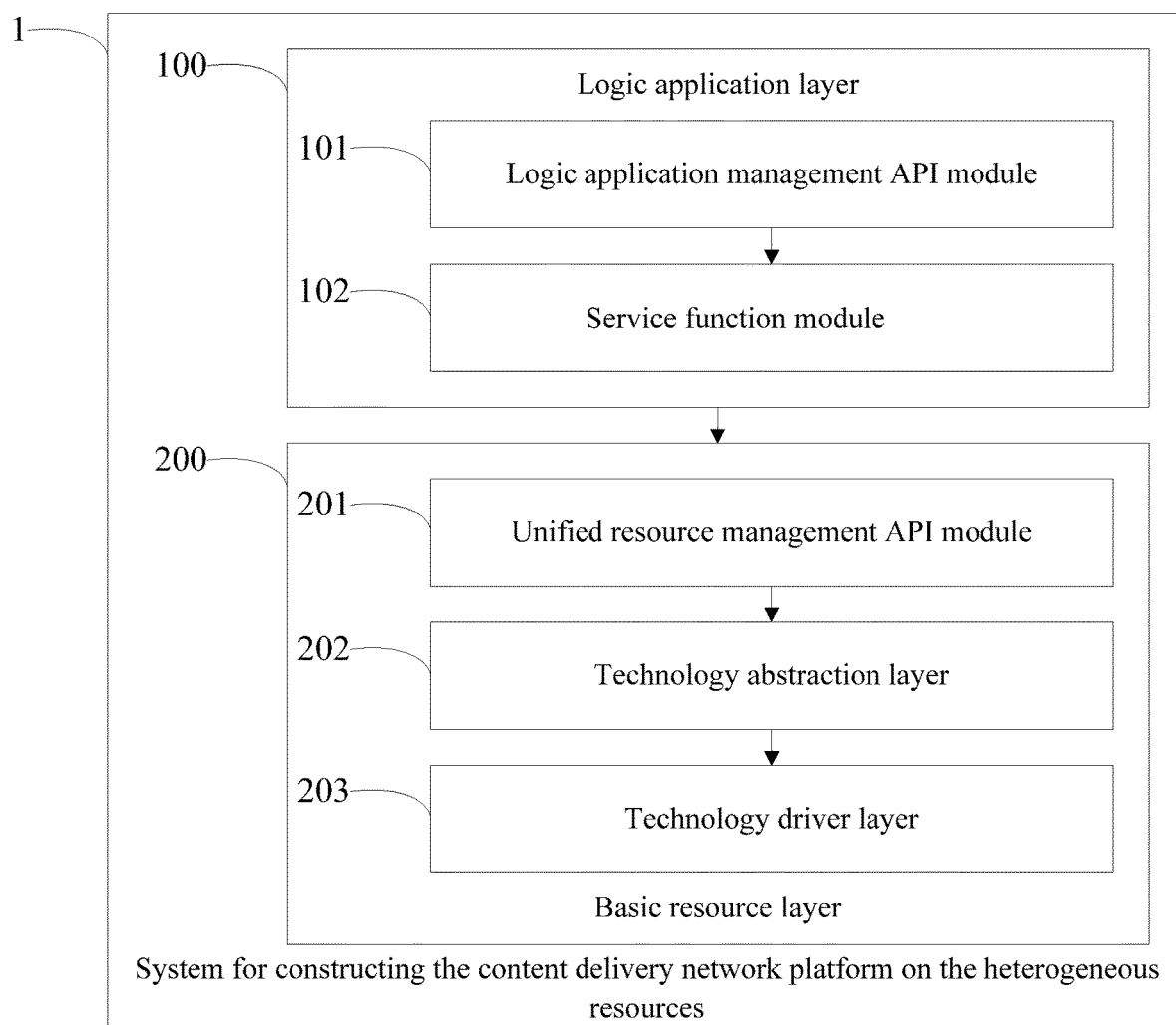
FIG. 5 is a detailed block diagram of the exemplary system 1 for constructing a content delivery network platform on heterogeneous resources in FIG. 4.

Specifically, FIG. 5 is a detailed block diagram of the exemplary system 1 for constructing a content delivery network platform on heterogeneous resources in FIG. 4.

The logic application layer 100 may include a logic application management API module 101 and a service function module 102.

The basic resource layer 200 may include a unified resource management API module 201, a technology abstraction layer 202, and a technology driver layer 203.

The logic application management API module 101 may be configured to manage the service function module 102. The service function module 102 may be configured to register the application information, verify the application basic information in the creation request through the logic application management API module 101. After the verification is passed, the service function module 102 may determine the actual resource configuration requirement information of the application based on the application ability requirement information in the creation request.

The unified resource management API module 201 may be configured to manage the technology abstraction layer and the technology driver layer. The technology abstraction layer 202 may be configured to abstract the same type of technologies into a resource type, and find a corresponding resource type through the unified resource management API module 201 based on the resource type information. The technology driver layer 203 may be configured to find a corresponding driver program based on the resource type of the technology abstraction layer 202 and the actual resource configuration requirement information. Further, the driver program may create a basic resource environment of the application through the unified resource management API module 201 by considering the actual resource configuration requirement information.

The present disclosure adopts a layered management approach to simplify the operation and maintenance. The disclosed method only needs to properly maintain the resource condition of the internal service and ensure the proper operation and redundant condition of the resources, without paying excessive attention to the specific application content and application functions under operation.

Figure 6:
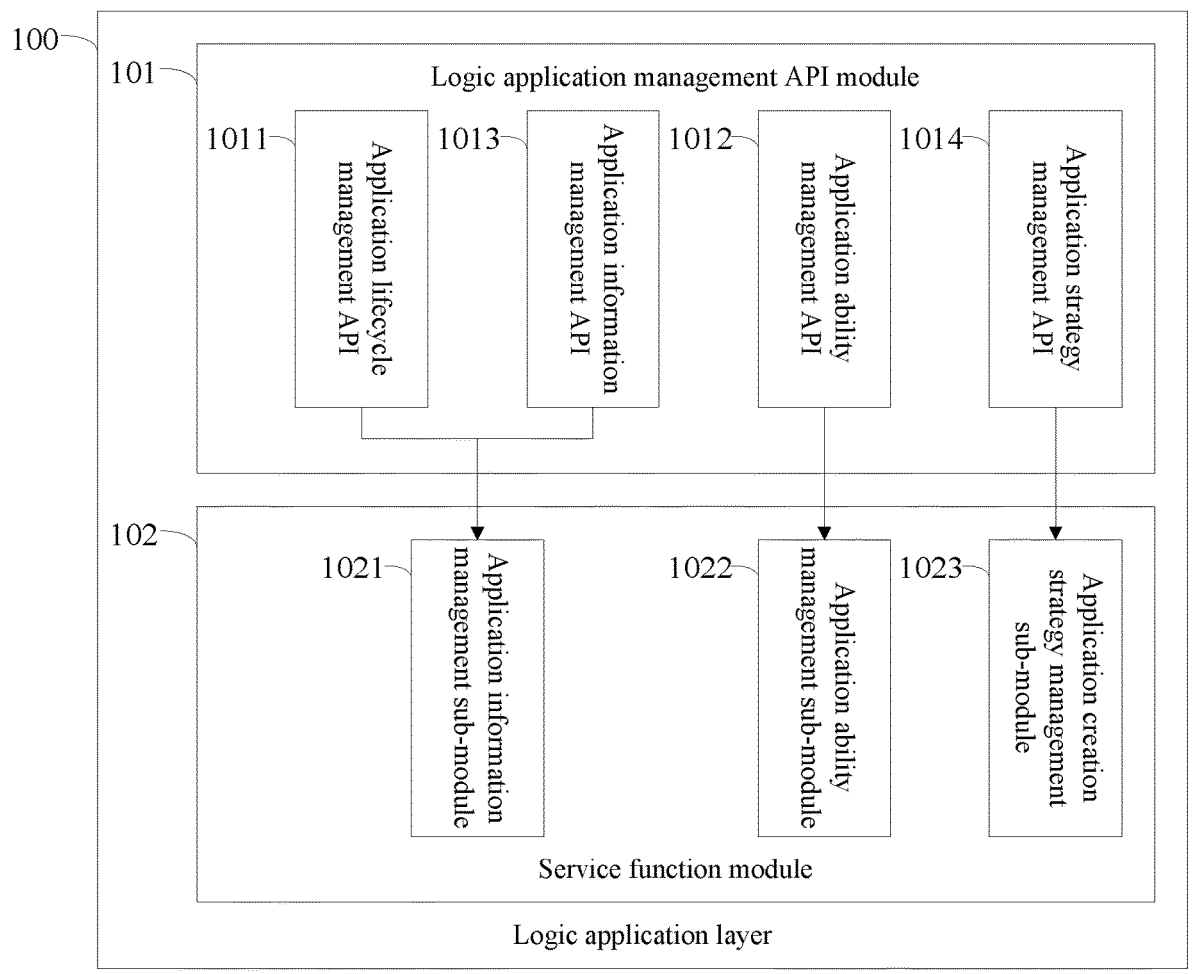
FIG. 6 is a detailed block diagram of a logic application layer 100 in FIG. 5.

FIG. 6 is a detailed block diagram of a logic application layer 100 in FIG. 5.

The logic application management API module 101 may include an application lifecycle management API 1011, an application ability inventory management API 1012, an application information management API 1013, and an application strategy management API 1014.

The service function module 102 may include: an application information management sub-module 1021, an application ability management sub-module 1022, and an application creation strategy management sub-module 1023.

The application lifecycle management API 1011 may be configured to provide an application creation request including looking up, deleting, adding, modifying, transferring and recovery of applications. The application ability management API 1012 may be configured to query and count the utilization condition and remaining condition of the application ability. The application information management API 1013 may be configured to query the application basic information. The application strategy management API 1014 may be configured to configure and query the automatic creation strategy.

The application information management sub-module 1021 may be configured to register the application basic information, application ability information, and application resource type information, and receive the application creation request sent by the application lifecycle management API 1011. Further, the application information management sub-module 1021 may query the registration information of the application through the application information management API 1013 for comparison with the information in the application creation request, thereby performing verification. The application ability management sub-module 1022 may, after verification is passed, query the utilization condition and remaining condition of the application ability counted by the application ability management API through the application ability management API, and then convert the application ability requirement information into the actual resource configuration requirement information based on a query result. The application creation strategy management sub-module 1023 may be configured to query the pre-configured automatic creation strategy through the application strategy management API when the application creation request does not include the resource type information, and determine the resource type information of the deployed application based on the automatic creation strategy and the actual resource configuration requirement.

Before an application is created, the application basic information, the application ability information, and the application resource type information may be registered in the logic application layer 100 through the application information management sub-module 1021. After an application creation request is sent to the application information management sub-module 1021 through the application lifecycle management API 1011, the application information management sub-module 1021 may query the registration information of the application through the application information management API 1013. Further, the registration information may be compared with the information in the application creation request, thereby performing verification. When the information is inconsistent, the verification fails, and the application creation process is terminated. When the information is consistent, the verification is passed, and the application ability management sub-module 1022 may query the utilization condition and remaining condition of the application ability counted by the application ability management API 1012 through the application ability management API 1012. Further, the application ability management sub-module 1022 may convert the application ability requirement information into the actual resource configuration requirement information based on the query result. When the application creation request does not include the resource type information, the application creation strategy management sub-module 1023 may query the pre-configured automatic creation strategy through the application strategy management API 1014, and determine the resource type information of the deployed application based on the automatic creation strategy and the actual resource configuration requirement.

The present disclosure may self-define the service ability model and the creation strategy in the logic application layer, complete the automatic deployment under various technical platforms. Different applications may share configurations or maintain individual configurations, and the configuration method may be flexible.

Figure 7:
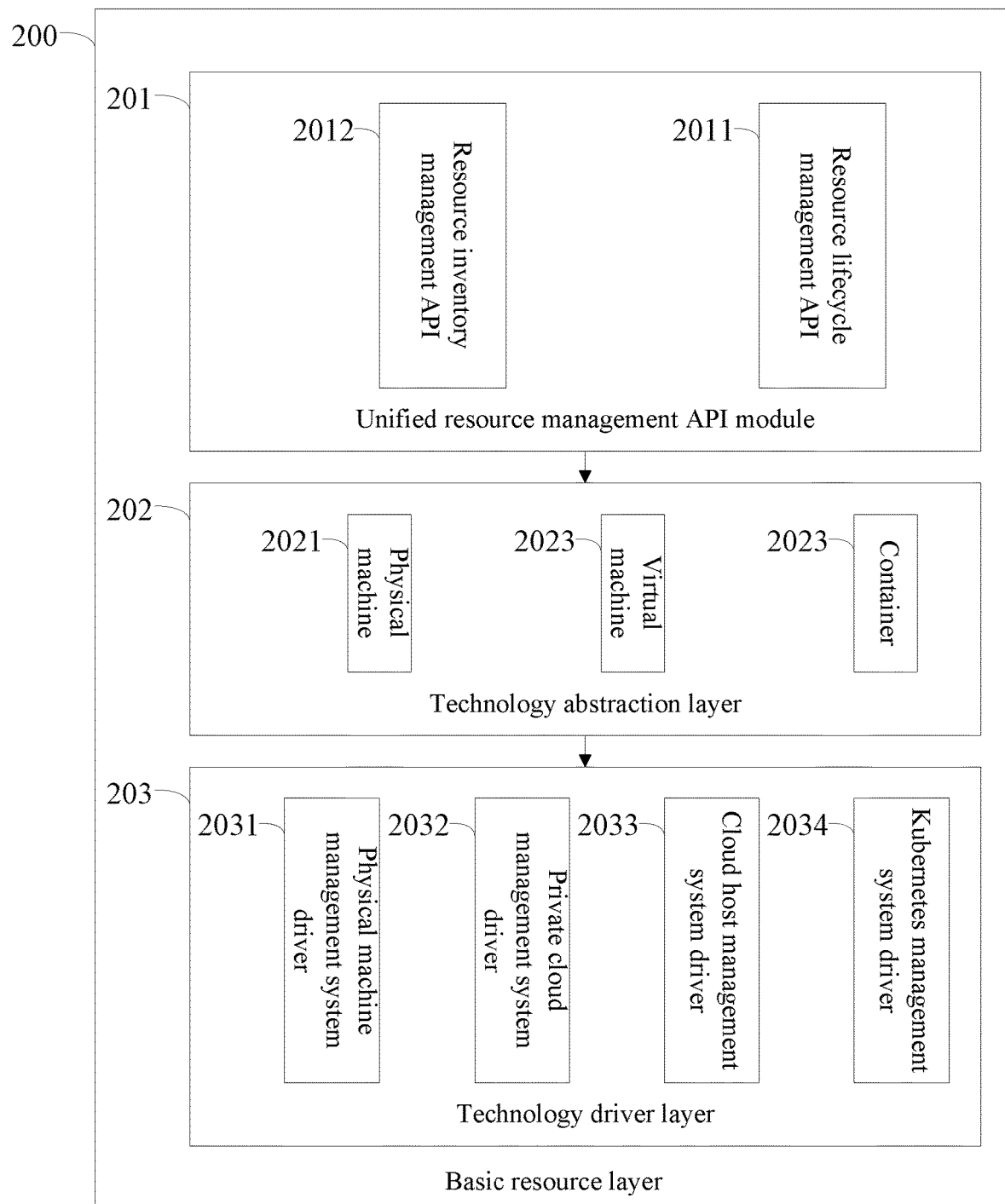
FIG. 7 is a detailed block diagram of a basic resource layer 200 in FIG. 5.

FIG. 7 is a detailed structure of a basic resource layer 200 in FIG. 5.

The unified resource management API module 201 may include a resource lifecycle management API 2011 and a resource inventory management API 2012. The resource lifecycle management API 2011 may manage the lifecycle of the basic resources, including querying, deleting, adding, and modifying. The driver program may integrate the actual resource configuration requirement information to create a basic resource environment of the application through the resource lifecycle management API 2011. The resource inventory management API 2012 may query and count the utilization condition and remaining condition of various resources, and find a corresponding resource type in the technology abstraction layer 202 based on the query result and the resource type information.

The resource types of the technology abstraction layer 202 may include: a physical machine 2021, a virtual machine 2022, and a container 2023.

The technology driver layer 203 may include: a physical machine management system driver 2031, a private cloud management system driver 2032, a cloud host management system driver 2033, and a Kubernetes management system driver 2034.

After receiving the actual resource configuration requirement information and the resource type information, the basic resource layer 200 may query and count the utilization condition and remaining condition of various types of the resources in the technology abstraction layer 202 through the resource inventory management API 2012, and may find a corresponding resource type in the technology abstraction layer based on the query result and the resource type information. Further, based on the actual resource configuration requirement, a suitable driver program corresponding to the resource type may be determined. Through the resource lifecycle management API 2011, the driver program may complete the creation of an application basic resource environment based on the actual resource configuration requirement information, and may complete the deployment and configuration of the application based on the application requirement.

The present disclosure adopts a two-layered abstraction driving mode to perform unified management on resources in the basic resource layer, thereby implementing the adoption of new technical solutions such as the physical machine and the virtual machine, etc. without changing the existing structure. As long as function connection is fulfilled in the technology driver layer of the resources, system management may be incorporated, and the new technical architecture may be rapidly introduced.

The sequence of the aforementioned embodiments of the present disclosure is merely for illustrative purposes, and may not represent any preferences.

The above-described device embodiments are merely for illustrative purposes. The units that are described as separated parts may or may not be physically detached. The parts displayed as units may or may not be physical units, and may be located at one place, or distributed over a plurality of network units. Based on the actual needs, a part of or all the modules may be selected to achieve the objective of the embodiments. The foregoing may be understood and implemented by those ordinarily skilled in the art without contributing creative labor.

Through the description of the aforementioned embodiments, those skilled in the relevant art may clearly understand that the embodiments may be implemented by means of software in conjunction with an essential common hardware platform, or may be simply implemented by hardware. Based on such understanding, the aforementioned technical solutions in nature or the part of the solutions that contribute to the existing technologies may be embodied in the form of a software product. The software product may be stored in computer readable storage media, such as ROM/RAM, magnetic disk, and optical disk, etc., and may include a plurality of instructions to enable a computer (may be a personal computer, a server, or a network device, etc.) to execute the methods described in each embodiment or some parts of the embodiments.

The foregoing are merely preferred embodiments of the present disclosure, and are not intended to limit the present disclosure. Any modifications, equivalent substitutions, and improvements, etc. without departing from the spirit and principles of the present disclosure shall all fall within the protection scope of the present disclosure.

What is claimed is:

1. A method for constructing a content delivery network platform on heterogeneous resources, wherein the content delivery network platform includes a logic application layer and a basic resource layer, the basic resource layer includes a technology abstraction layer and a technology driver layer, the method comprising:

after receiving an application creation request, determining, by the logic application layer, actual resource configuration requirement information and resource type information of an application based on the application creation request, and sending, by the logic application layer, the actual resource configuration requirement information and the resource type information to the basic resource layer; and receiving, by the basic resource layer, the actual resource configuration requirement information and the resource type information, and finding, by the basic resource layer, a corresponding resource type based on the resource type information at the technology abstraction layer, and finding, by the basic resource layer, a corresponding driver program based on the corresponding resource type and the actual resource configuration requirement information at the technology driver layer, and creating, by the basic resource layer, a basic resource environment of the application through the driver program in conjunction with the actual resource configuration requirement information.

2. The method for constructing the content delivery network platform on the heterogeneous resources according to claim 1, wherein, after receiving the application creation request, determining, by the logic application layer, the actual resource configuration requirement information and the resource type information of the application based on the application creation request, and sending, by the logic application layer, the actual resource configuration requirement information and the resource type information to the basic resource layer specifically includes:

registering application information in the logic application layer, verifying application basic information in the application creation request, determining the actual resource configuration requirement information of the application based on application ability requirement information in the application creation request after verification is passed, and sending the actual resource configuration requirement information and the resource type information to the basic resource layer.

3. The method for constructing the content delivery network platform on the heterogeneous resources according to claim 2, wherein:

the application creation request includes at least the application basic information and the application ability requirement information, and the resource type information;

the application basic information includes one or more of an application name, an IP address, and a deployment region;

the application ability requirement information includes one or more of an API response ability, a bandwidth ability, a high availability ability, and an output/input ability; and the resource type information includes one or more of a physical machine, a virtual machine, and a container.

4. The method for constructing the content delivery network platform on the heterogeneous resources according to claim 3, wherein, after receiving the application creation request, determining, by the logic application layer, the actual resource configuration requirement information and the resource type information of the application based on the application creation request, and sending, by the logic application layer, the actual resource configuration requirement information and the resource type information to the basic resource layer specifically includes:

registering the application basic information, the application ability requirement information, and the resource type information in the logic application layer;

after receiving the application creation request, querying, by the logic application layer, registration information of the application for comparison with the information in the application creation request, thereby performing verification;

after the verification is passed, querying, by the logic application layer, utilization condition and remaining condition of the application ability, and converting, by the logic application layer, the application ability requirement information into the actual resource configuration requirement information based on a query result;

when the application creation request includes the resource type information, sending, by the logic application layer, the resource type information in the application creation request and the actual resource configuration requirement information to the basic resource layer; and when the application creation request does not include the resource type information, querying, by the logic application layer, a pre-configured automatic creation strategy, determining, by the logic application layer, the resource type information of the deployed application based on the actual resource configuration requirement and the automatic creation strategy, and sending, by the logic application layer, the resource type information and the actual resource configuration requirement information to the basic resource layer.

5. The method for constructing the content delivery network platform on the heterogeneous resources according to claim 4, wherein:

the automatic creation strategy includes a current resource redundant condition, an existing resource allocation condition, and a desired resource type of the application itself.

6. The method for constructing the content delivery network platform on the heterogeneous resources according to claim 5, the method further includes:

abstracting, by the basic resource layer, a same type of technologies into a single resource type.

7. The method for constructing the content delivery network platform on heterogeneous resources according to claim 4, wherein:

after receiving the request to create the application, the logic application layer queries the registration information that a to-be-created application has registered in advance in the logic application layer, wherein the registration information includes a previously registered application account, the application name, the IP address, and the deployment region.

8. The method for constructing the content delivery network platform on the heterogeneous resources according to claim 7, wherein:

if the information is consistent, the verification is successful, and the application is continued to be created in a system corresponding to the content delivery network platform; and if the information is inconsistent, the verification fails, and a creation process corresponding to the application creation request is terminated.

9. The method for constructing the content delivery network platform on the heterogeneous resources according to claim 3, wherein:

the application ability requirement information further includes one or more of a virtual network card connection mode, a processor processing capability, a memory size, and a storage capacity; and the resource type information further includes one or more of a physical machine management system driver, a private cloud management system driver, a cloud host management system driver, and a Kubernetes management system driver.

10. A system for constructing a content delivery network platform on heterogeneous resources, comprising a logic application layer and a basic resource layer implemented by computer programs stored in a memory and executable by a processor, the basic resource layer includes a technology abstraction layer and a technology driver layer, wherein:

the logic application layer, configured to, after receiving an application creation request, determine actual resource configuration requirement information and resource type information of an application based on the creation request, and send the actual resource configuration requirement information and the resource type information to a basic resource layer; and the basic resource layer, configured to find a corresponding resource type based on the resource type information at the technology abstraction layer of the basic resource layer, and find a corresponding driver program based on the corresponding resource type and the actual resource configuration requirement information at the technology driver layer of the basic resource layer, and create a basic resource environment of the application through the driver program in conjunction with the actual resource configuration requirement information.

11. The system for constructing the content delivery network platform on the heterogeneous resources according to claim 10, wherein the logic application layer includes:

a logic application management API module, manage a service function module; and the service function module, configured to register application information, verify application basic information in the application creation request through the logic application management API module, and determine the actual resource configuration requirement information of the application based on application ability requirement information in the application creation request.

12. The system for constructing the content delivery network platform on the heterogeneous resources according to claim 11, wherein the logic application management API includes:

an application lifecycle management API, configured to provide the application creation request including looking up, deleting, adding, modifying, transferring and recovering of the application;

an application ability management API, configured to query and count utilization condition and remaining condition of application ability;

an application information management API, configured to query the application basic information; and an application strategy management API, configured to configure and query an automatic creation strategy.

13. The system for constructing the content delivery network platform on the heterogeneous resources according to claim 12, wherein the service function module includes:

an application information management sub-module, configured to register the application basic information, the application ability requirement information, and the resource type information, receive the application creation request sent by the application lifecycle management API, query registration information of the application through the application information management API for comparison with the information in the application creation request, thereby performing verification;

an application ability management sub-module, configured to query the utilization condition and the remaining condition of the application ability counted by the application ability management API through the application ability management API, and convert the application ability requirement information into the actual resource configuration requirement information based on a query result; and an application creation strategy management sub-module, configured to query a pre-configured automatic creation strategy through the application strategy management API when the application creation request does not include the resource type information, and to determine the resource type information for the deployed application based on the automatic creation strategy and the actual resource configuration requirement.

14. The system for constructing the content delivery network platform on the heterogeneous resources according to claim 13, wherein the basic resource layer includes:

a unified resource management API module, configured to manage the technology abstraction layer and the technology driver layer;

the technology abstraction layer being configured to abstract a same type of technologies into a resource type.

15. The system for constructing the content delivery network platform on the heterogeneous resources according to claim 14, wherein the unified resource management API module includes:

a resource lifecycle management API, configured to manage a lifecycle of basic resources, including querying, deleting, adding, and modifying, wherein the driver program integrates the actual resource configuration requirement information to create the basic resource environment of the application through the resource lifecycle management API; and a resource inventory management API, configured to query and count the utilization condition and the remaining condition of different types of resources, and find a corresponding resource type in the technology abstraction layer based on a query result and the resource type information.

16. The system for constructing the content delivery network platform on the heterogeneous resources according to claim 15, wherein the resource type in the technology abstraction layer includes a physical machine, a virtual machine, and a container.

17. The system for constructing the content delivery network platform on the heterogeneous resources according to claim 14, wherein the technology driver layer includes one or more of a physical machine management system driver, a private cloud management system driver, a cloud host management system driver, and a Kubernetes management system driver.

* * * * *